United States Patent [19]
Wilson et al.

[11] Patent Number: 5,838,772
[45] Date of Patent: Nov. 17, 1998

[54] VOICE SERVICES EQUIPMENT

[75] Inventors: Jeffrey Wilson, Fareham; John Stephen Sinden, Hayling Island, both of England

[73] Assignee: Telsis Holdings Limited

[21] Appl. No.: 157,076

[22] PCT Filed: Jun. 3, 1992

[86] PCT No.: PCT/GB92/01000

§ 371 Date: Dec. 3, 1993

§ 102(e) Date: Dec. 3, 1993

[87] PCT Pub. No.: WO92/22165

PCT Pub. Date: Dec. 10, 1992

[30] Foreign Application Priority Data

Jun. 4, 1991 [GB] United Kingdom ............... 9111947

[51] Int. Cl.$^6$ ............................................. H04M 1/64
[52] U.S. Cl. ........................... 379/67; 379/89; 379/211; 379/165
[58] Field of Search ................... 379/67, 88, 89, 379/158, 165, 112, 196, 197, 198, 189, 201, 212, 211

[56] References Cited

U.S. PATENT DOCUMENTS

| | | | |
|---|---|---|---|
| 4,028,498 | 6/1977 | Mehaffey | 179/18 |
| 4,054,756 | 10/1977 | Comella et al. | . |
| 4,674,115 | 6/1987 | Kaleita | 379/201 |
| 4,696,028 | 9/1987 | Morganstein et al. | . |
| 4,797,911 | 1/1989 | Szlam et al. | 379/67 |
| 4,797,915 | 1/1989 | Bowker | 379/216 |
| 4,809,321 | 2/1989 | Morganstein et al. | . |
| 4,825,460 | 4/1989 | Carter et al. | . |
| 4,847,890 | 7/1989 | Solomon et al. | 379/67 |
| 4,852,149 | 7/1989 | Zwick et al. | . |
| 5,193,110 | 3/1993 | Jones et al. | 379/94 |
| 5,214,688 | 5/1993 | Szlam et al. | 379/67 |
| 5,479,487 | 12/1995 | Hammond | 379/210 |
| 5,557,668 | 9/1996 | Brady | 379/212 |

FOREIGN PATENT DOCUMENTS 0199255  10/1986  European Pat. Off. .
WO9107838  5/1991  WIPO .

*Primary Examiner*—Fan S. Tsang
*Attorney, Agent, or Firm*—Renner, Otto, Boisselle & Sklar, P.L.L.

[57] ABSTRACT

A voice services equipment includes a voice services module with a plurality of audio ports and a switching device responsive to an interactive control signal from a call control processor of the module to provide a selectable switching function between the audio ports of the module and a plurality of connections to a telephone network. The VSE is user programmable and includes a plurality of connections for incoming calls via an interface and a plurality of connections for outgoing calls via an interface. The switching device can switch between selected combinations of incoming call connections, outgoing call connections and the audio ports of the module. The switching device can thus connect a caller to a called party via the incoming and outgoing connections, and keep monitoring the call for billing purposes or in order to provide a follow-on call.

23 Claims, 2 Drawing Sheets

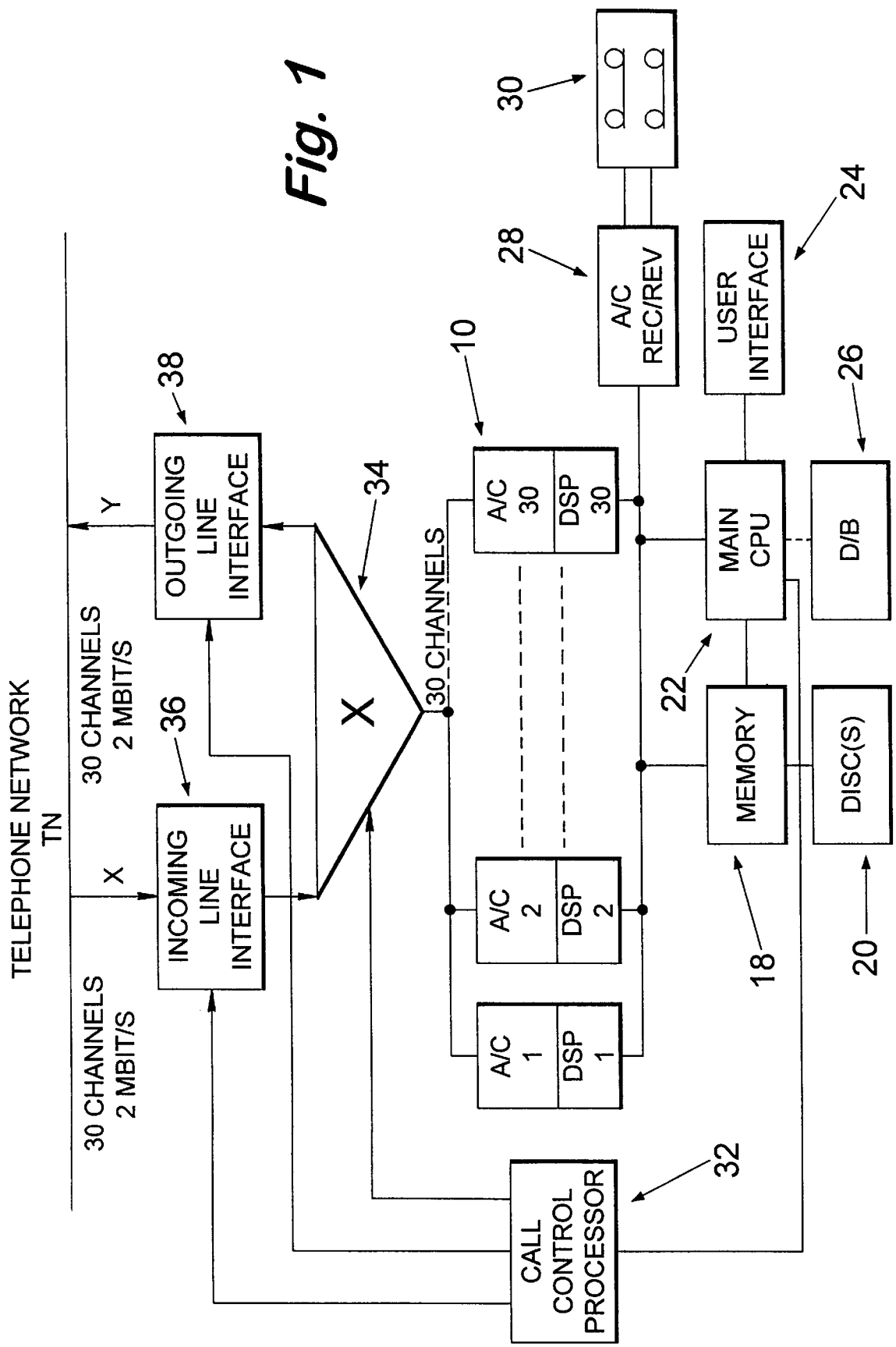

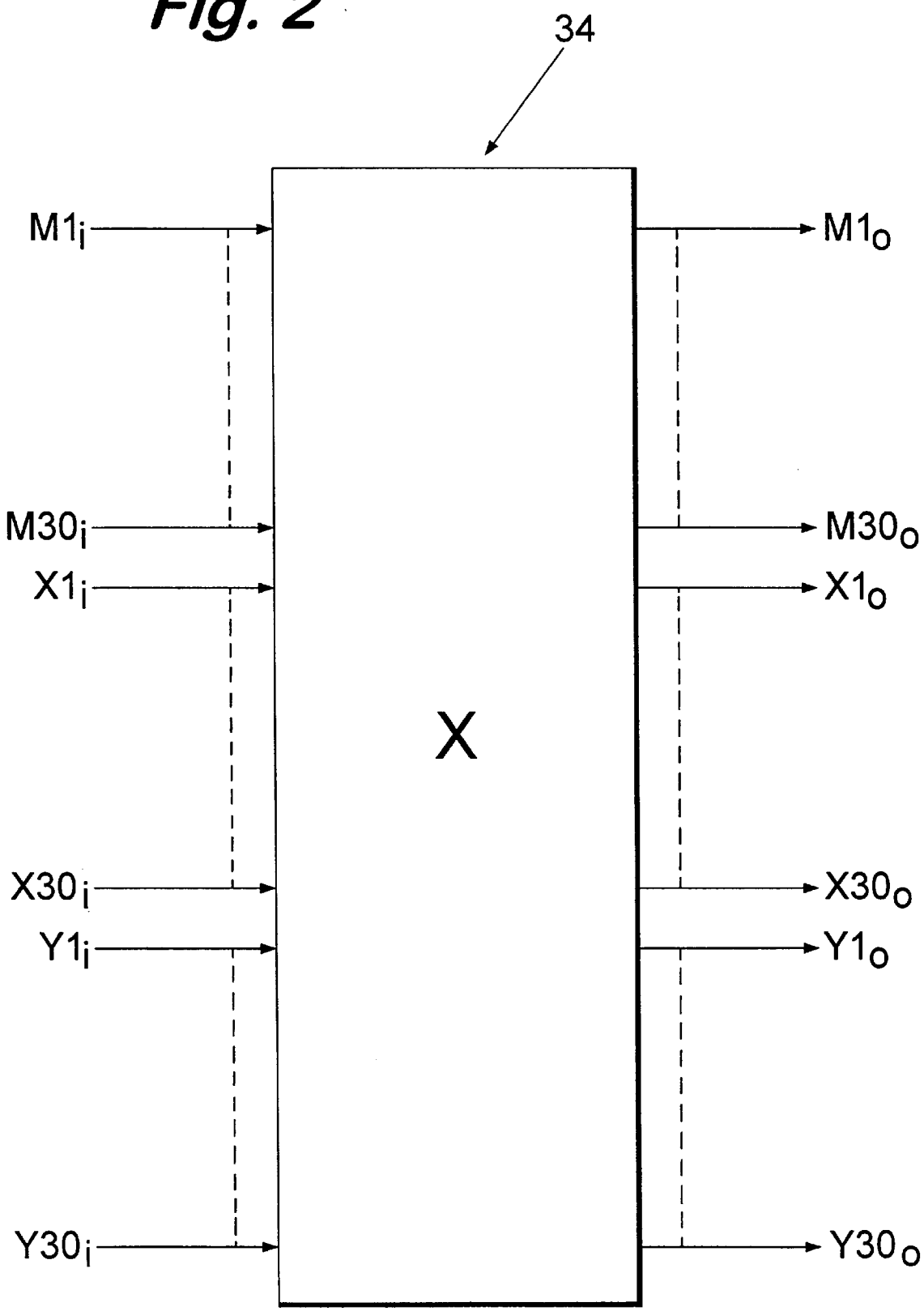

VOICE SERVICES EQUIPMENT

This invention relates to voice services equipment, that is equipment capable of providing announcements to telephone users and recording messages from callers, and with which callers may interact by means of voice instructions or other signals, such as tones or pulses, generated by telephones.

It is known for a telephone call to be completed in one of the following ways:

(i) a caller may talk directly to a called party;

(ii) a caller may talk directly to a voice services equipment (VSE);

(iii) a caller may initially talk to a VSE which subsequently transfers the call for the caller to talk directly to a called party or to another VSE;

(iv) a caller may initially talk directly to a called party who may subsequently transfer the call to a VSE or to another called party.

The call transfer actions in (iii) and (iv) may be extended so that more than one transfer is effected to complete a call. A call transfer is generally achieved by signaling to the telephone exchange, such as by using a "recall" command followed by the digit string identifying the new address (telephone number) to which the call is to be transferred. Thus the call transfer action itself is effected by the exchange (although on the basis of a remote command), and thus this transfer facility is only available if the exchange has suitable provision for the facility.

A VSE generally includes a trunk interface, such as a digital trunk interface, which connects audio circuits within the VSE to the telephone network. Depending on the operation performed by the VSE, it is sometimes necessary for the VSE to call out on another line in order to complete a call while the caller is on one line and associated audio circuit of the VSE. In this case, two lines and two audio circuits may be required simultaneously for one call, which represents inefficient resource utilisation. In addition to this, when for example a call transfer is effected via the telephone exchange as described above, the VSE is no longer party to the call and so it is not possible for the VSE to continue monitoring the call, for instance for further voice communications or for signaling messages for either the caller or the called party. In some instances, the VSE may stay on-line after dialing out and connecting to the called party (typically known as a 3-way call), but it is not then normally possible for the VSE to monitor and immediately detect signaling conditions from both the calling and called parties.

According to the invention there is provided a voice services equipment comprising a voice services module having a plurality of audio ports, and switching means responsive to an interactive control signal from the voice services module to provide a selectable switching function between the audio ports and a plurality of connections to a telephone network.

In a preferred embodiment of the invention, the equipment includes a plurality of connections for incoming calls and a plurality of connections for outgoing calls, and the switching means can provide a switching function between a selected combination of the incoming call connections, outgoing call connections and the voice services module. In the preferred equipment, the switching means can switch between thirty incoming channels, thirty outgoing channels, and thirty channels of the voice services module. Two digital trunk interfaces are provided between the switching means and the telephone network, one for the thirty incoming channels and the other for the thirty outgoing channels. Thus calls on the incoming trunk are handled by the VSE; if a transfer is requested for call completion, then an outbound call (to a called party or to another VSE) is made on the outgoing trunk. Thus, the connections between the incoming and outgoing trunks (and therefore between the caller and the called party) are achieved within the VSE which is accordingly able to monitor either of the trunks for further voice band communications or for signaling messages from the telephone network, and to take appropriate action.

In the preferred equipment, audio recording and replay facilities enable messages recorded by the caller during communication with the VSE to be replayed to the called party prior to connection of the incoming and outgoing trunks to enable the caller to talk directly to the called party.

The equipment preferably includes internal data storage facilities and one or more communications interfaces to enable the VSE to communicate with an external computer system. This facility can be used to enable external validation of the caller, destination telephone numbers, and can also be used to provide in-service statistics and information for billing purposes.

The preferred equipment utilises a simple yet powerful applications language to allow equipment users to define their own service applications, including for example call routing, replay of announcements, recording of messages, calculations involving arithmetic and logical functions, interaction and communication with an external computer system.

The preferred equipment exhibits a number of advantages, as follows. The voice services module to be used with the switching means can be broadly similar to well-developed and tested modules in existing VSEs. The system implementation can be independent of current network facilities; for example, the central exchange does not require the provision of call transfer facilities, and the central exchange does not need to be modified for billing. The equipment may stay on-line during the call, offering facilities such as follow-on calls and the ability to generate sophisticated statistics. The equipment is very flexible, in part as a result of being user programmable by means of a simple but powerful applications language. The equipment is readily enhanceable with both hardware and software facilities. The user interface provides sophisticated facilities to enable new services to be added and trialled very easily. Direct Dial In (DDI) interfaces enable a large number of services to be provided on the same equipment. The provision of thirty channel capability is of a full non-blocking nature. The system is readily expandable by utilising two or more VSEs connected by a local area network. Open interfaces are provided for database connections.

The invention will now be described by way of example with reference to the accompanying drawings, throughout which like parts are referred to by like references, and in which:

FIG. 1 is a schematic block diagram of voice services equipment according to an embodiment of the invention; and FIG. 2 is a diagram showing the switching device in more detail.

Referring to FIG. 1 of the drawings, a voice services module 10 of a VSE includes a number of, for example thirty as shown, audio circuits A/C 1 to A/C 30 each of which is for servicing a particular audio channel. Digital signal processors DSP 1 to DSP 30 are associated with respective ones of the audio circuits A/C 1 to A/C 30. On one side the audio circuits A/C 1 to A/C 30 and the digital signal processors DSP 1 to DSP 30 are connected to a main central processing unit (CPU) 22. A memory 18 provides a program and data storage medium, as well as temporary buffering between the audio circuits and one or more hard discs 20. The main CPU 22 is also connected to the memory 18, a user interface 24, and a database 26 which may be internal or external to the equipment, or to other external computer systems. An audio record/review circuit 28 is provided to which a tape recording/reproduction apparatus 30 (comprising one or more tape recording/reproduction decks) is connected.

As thus far described, the voice services module 10 operates in a known manner by processing incoming or outgoing audio messages in the audio circuits, the memory 18 being used for temporary storage of messages to or from the disc(s) 20. The audio record/review circuit 28 and the tape recording/reproduction apparatus 30 are available for the user to enter voice messages into the memory 18 and thence to the disc(s) 20, and also to transfer messages left by callers on the disc(s) 20 to tape. These various operations are under the control of the main CPU 22 which issues and receives control signals to and from the digital signal processors DSP 1 to DSP 30, and also via a call control processor 32.

It has previously been known for the voice services module 10 to be connected via a line interface to a telephone network TN such as the public switched telephone network (PSTN). A number of connections, typically corresponding to the number of audio circuits A/C 1 to A/C 30 are provided in the interface to connect to a corresponding number of lines. This arrangement has the disadvantages discussed above, namely that if it is necessary for the VSE, having received a call on one line, to complete the call on another line, this can tie up two audio circuits and two lines. Furthermore, if call transfer is effected via the telephone exchange, the VSE may lose control of the call and further monitoring may not be possible. Still further, it may in particular cases be necessary to block a certain number of lines to incoming calls, so as to allow the VSE to make outgoing calls (for example, of messages left earlier by unsuccessful callers) even when there is heavy usage of the equipment on the incoming call side. Such line blocking reduces the flexibility of the equipment.

The arrangement shown in FIG. 1 is a considerable improvement of the single interface equipment discussed above, in that it allows the VSE to have increased monitoring functions during call connection and other operations. Rather than connecting the voice services module via a single interface to the telephone network TN, the arrangement of FIG. 1 connects the voice services module 10 via a switching device 34 to an incoming line interface 36 and also to an outgoing line interface 38, all of which are under the control of the call control processor 32. In the example of FIG. 1, the voice services module 10 has thirty channels, and there are also thirty incoming channels on a trunk X and thirty outgoing channels on a trunk Y. The switching device 34, under the control of the call control processor 32, is capable of providing multi-way selectable switching between the module 10, the incoming trunk X and the outgoing trunk Y. Thus when, for example, a caller calls the VSE, a switched connection is made between the incoming trunk X and the module 10. When, for example, the VSE makes an outgoing call, a switched connection is made between the module 10 and the outgoing trunk Y. When, for example, the VSE, having previously received a call, connects the caller to another party, a switched connection is made between the incoming trunk X and the outgoing trunk Y. In the latter case, depending on the circumstances, the module 10 may no longer be connected to the call (as a result of which all of its voice channels are available for other operations), or it may continue to monitor the call by means of a further switched connection, for example for call billing purposes.

It will be seen that the/addition of the switching device 34 and the dual (incoming and outgoing) interface arrangement considerably increases the versatility and efficient usage of the equipment. Call connection can be achieved without relying on a telephone exchange recall facility; furthermore, the call can continue to be monitored or not, as desired. Also, since a dedicated outgoing trunk is provided, there is no need to arrange for line blocking in order to ensure outgoing call capability.

FIG. 2 is a schematic representation of the switching device 34. This can readily be implemented by a standard telecoms switch programmable to provide the required switching functions. For use in a VSE embodying the present invention, the switch is programmed to provide any or all of the functions which will be described subsequently. As shown in FIG. 2, the switching device 34 includes at least ninety input connections, thirty for each of the module ($M1_i$ to $M30_i$), the incoming trunk ($X1_i$ to $X30_i$) and the outgoing trunk ($Y1_i$ to $Y30_i$). Similarly, there are at least ninety output connections, thirty for each of the module ($M1_o$ to $M30_o$), the incoming trunk ($X1_o$ to $X30_o$) and the outgoing trunk ($Y1_o$ to $Y30_o$). The switching device 34 is programmed to provide all the possible required switching connections between the three sides of the switch. It is important to note that, since there are input and output connections, the switching path is unilateral. Thus, for example, it is possible for the module 10 to monitor a transferred call now connected (bilaterally) between lines on the X and Y trunks with only an output switch connection to the module 10. In other words, if for example the caller is connected to the called party via line 1, the connections $X1_i$, and $Y1_o$ as well as $X1_o$ and $Y1_i$ will be respectively switched together. If call monitoring by the VSE is required, the connection $M1_o$. will also be switched with one of the above combinations. It is not necessary for the connection $M1_i$ also to be switched if only monitoring is required. It should be noted that FIG. 2 is purely representational, since each of the thirty grouped connections will in practice be constituted by a single multiplexed transmission line, each of the channels occupying a particular time slot within the signal format. Thus the switching will be achieved on a time division multiplexed basis.

The apparatus shown in FIG. 1 is a thirty channel interactive VSE in which audio material, either outbound to the caller, or inbound from the caller, is stored on one or more discs. Callers can interact with the system using any of seven or more interactive techniques, such as multi-frequency (MF) tone detection, pulse detection, voice detection, speaker dependent recognition, speaker independent recognition, voice interrupt or recognition interrupt, depending on equipment user requirements. The equipment has two 2M bit/s PCM trunk interfaces 36,38, one for incoming calls only and the other for outgoing calls only. Incoming calls can be handled by the voice services module 10 and can be connected if required to channels on the outgoing trunk Y. When a call is thereby routed from a caller to a called party, the VSE and its interactive facilities are fully available to monitor the audio in either direction. The call routing method is typically as follows. Incoming calls are initially handled by the known voice services facilities. Outgoing calls may be placed as part of the service and the switching device 34 enables the incoming and outgoing trunks X, Y to be routed independently on a per channel basis. Incoming channels can therefore be connected to corresponding outgoing channels as required.

In the preferred equipment, the digital signal processors DSP 1 to DSP 30 can provide MF tone detection and voice detection. However, if required, pulse detection, speech recognition (both speaker dependent and speaker independent), voice interrupt and recognition interrupt can be provided. The user interface 24 enables the equipment user to programmed the VSE as required. As a result of this, new services are simple to implement. Audio-loading, system diagnostics and call logging as well as other management and administration facilities are provided as standard.

The disc(s) 20 provide a large message storage capacity, currently in the order of hundreds of hours. The main CPU 22 maintains date and time information internally in a number of different formats, and provides various programmable facilities to enable the service provider to configure the service as required. Furthermore, random numbers can be generated on request; this facility may be used to add variety to a service, or to ensure that callers will not always hear information presented in the same order.

The data base 26 may, as described above, be either internal or external. When connected to an external computer over a communications link such as RS 232, X.25, Local Area Network (LAN) or other link, the flow of the programmed may therefore be changed according to the data received from the external computer.

The VSE can record caller messages; these may then be made available to other callers. Thus audio material on the system may be updated remotely over the PSTN. When responsive to MP tone detection, password security may be provided, and the information provider may identify the material which is to be updated. The new recording may be replayed for confirmation by MF tone entry.

The equipment may be configured to allow a caller to record a message which is then stored on the disc(s) 20. Each caller recording is tagged so that it is possible to differentiate between caller recordings generated under different services, and at different points in the service(s). The user interface 24 provides a number of facilities for effective management of caller recordings. For example, all messages with a specified tag may be dumped off to the audio record/review circuit 28; any messages of insignificant duration may be ignored.

The equipment as shown in FIG. 1 is extremely flexible in that its hardware facilities can be utilised as required by the equipment user, with programming via a simple but powerful applications language. In the context of an Account Call service, the fundamental facilities of the equipment which are immediately applicable include:

(i) incoming calls on the trunk X are answered by the VSE;

(ii) user defined announcements are played to the caller;

(iii) MF tone detection is used to receive an account number, PIN, destination phone number and the like;

(iv) the connection to the data base 26 for information validation;

(v) out-dialing to a destination on the outgoing trunk Y;

(vi) possible connection of the trunks X and Y;

(vii) trunk Y monitoring for caller answer;

(viii) X and Y trunk monitoring for caller cleardown;

(ix) caller audio monitoring (on the trunk X) for MF commands for follow-on calls;

(x) call detail information can be passed to the data base 26 for billing purposes;

(xi) caller recording is possible in the case of no answer from the called party; and (xii) subsequent message delivery to the called party, if required.

The full functionality of the service is entirely at the discretion of the user. Facilities such as transfer to operator can be included at any point in the service. For example, the caller can be asked to press a key if he wishes to speak directly to an operator, or the system can connect the caller directly, through out-dialing on the trunk Y, if the caller is clearly having some problem in using the system; retry loops can be included as required.

The fundamental steps in an account call are set out below, but the actual service content and functionality can be set up to meet the requirements of the user and his customers.

Any language can be used during a call, simply by "switching" in a different set of audio files. The selection can be made by asking the caller which language he wishes to use, or by accepting appropriate commands entered without prompting. Alternatively the selection could be automatic using a DDI number of specific channel routing; after the caller has entered his account number and/or PIN, the data base 26 could instruct the equipment to use a different language for further prompts and information. In addition, a different language can be used for audio output from the equipment to the called party.

The typical steps in an account call sequence will now be described.

1 The caller connects to the VSE on the incoming trunk X, the switching device 38 connecting that channel on the trunk X to the corresponding channel in the voice services module 10.

2 Under control of the main CPU 22, a welcome is given to the caller via the disc(s) 20, memory 18 and respective audio circuit, and also a prompt for the caller's charge card number.

3 The caller then enters his charge card number, for example by means of MF tones.

4 The equipment asks the caller for the caller's PIN.

5 The caller enters the PIN.

6 The entered charge card number and PIN are passed to an external data base for validation.

7 After validation, the equipment asks the caller for the destination number.

8 The caller enters the destination number.

9 The equipment validates the destination number, either internally or externally on the data base.

10 If the charge card number,- PIN and destination number are valid, the equipment dials out to the required called party on the outgoing trunk Y.

11 The switching device 34 connects both parties directly via the trunks X and Y.

12 The system reports the called party's answer to the data base.

13 The equipment monitors both parties for call cleardown by means of the switching device 34 and the call control processor 32, and reports cleardown to data base.

14 The equipment can also monitor a caller on the trunk X for MF sequences indicating that the caller requires a follow-on call. This allows a follow-on call to be made without needing to carry out the charge card number and PIN validation steps again.

15 The data base 26 subsequently produces billing records based on the account calls connected by the VSE.

For account call applications, an additional service of abbreviated dialing can also be provided to enhance customer satisfaction. In this instance, the data base 26 can hold a list of telephone numbers and abbreviated codes for each subscriber. Voice messaging facilities can be incorporated if required; if there is no answer from the called party, then the equipment can record the caller's message on the disc(s) 20, and then attempt to deliver it for a user-defined period at programmed intervals. With data base support, the caller can be given a PIN after leaving a message and can then ring back to check whether the message has been delivered.

Another service that can be provided is for auto-collect call applications. The benefit of the equipment is that it can easily record the caller's name and then announce it to the called party before the called party's acceptance of the call. The call sequence can typically be as follows.

1 The caller connects to the equipment.

2 The caller is welcomed by an appropriate message and is prompted for the required destination number.

3 The caller enters the destination number.

4 The equipment validates the destination number, either internally or externally on the data base.

5 The equipment asks the caller for his/her name and records it.

6 The equipment dials out to the required destination number.

7 When the called party answers, the equipment introduces a collect call, replays the caller's name and asks for the called party's confirmation of acceptance.

8 If the called party accepts the collect call, the caller is connected through via the trunks X and Y.

9 The equipment monitors both parties for call cleardown.

10 The data base produces the billing records.

Other possible services include third party billing and subscription services. These two services are essentially account calls, with the caller entering some form of identification. One example of a subscription service is a high value premium rate service. This would allow charging at rates above the standard rates.

Another service can provide a "follow me" facility by means of a personal number. A subscriber can buy or rent a personal number which will connect to the VSE. The subscriber dials into the VSE whenever he changes location and specifies the new number of the telephone on which he can be contacted. The contact number can be on the PSTN, on a mobile network or even international, since the subscriber will pay for the onward routed call. Callers to the subscriber's personal number may pay at local rate, trunk rate, toll free or other rate, as determined by the subscriber in selection of his personal number. Calls to the personal number are then automatically connected to the most recently given contact number. If it is not able to connect a call to the subscriber, or if the subscriber has requested such automatic action, the equipment can record a message from the caller for later access by the subscriber or automatic delivery to the subscriber. The subscriber may be alerted to the presence of a message in a number of ways, including by radio-paging using a communications interface of the equipment to connect to the radio-paging system to send an alert message.

As well as re-direction calls to the subscriber, other services which have been subscribed for can be transported and managed via the equipment.

A further service which can be provided by the equipment is call completion. In conjunction with Calling Line Identification (CLI) or cell number provision in a mobile environment, the equipment can be used to offer the caller a choice of items in a certain category (for example, hotel, restaurant, garage, specialist retailers, local dealers) and, at the caller's request, then dial out to complete the call to the selected party. The CLI or cell number is used to identify the caller's area so that the appropriate regional facilities can be offered. This facility is particularly useful for mobile telephone users in a hands-free environment who may then only have to dial a short code to be connected to one of a range of destinations. The arithmetic and random number facilities available in the equipment can also be used in some applications to route the caller automatically to one of the set of destinations on a sequence or random basis.

The above services and applications are given by way of example only. In view of the ease of programming the equipment to the user's requirements, many other facilities or variations on the above facilities could be provided.

From the above description of the various modes of operation, it will be clear that DDI interfaces to the network are preferred since DDI can be used very effectively to provide a wide range of services on the same equipment. With DDI, the final digits of the telephone number are passed to the terminating equipment and can be used to select the service that is provided for each call. With two digit DDI, up to 100 services can be provided on each line; with three digit DDI, up to 1000 services could be provided. Thus line utilisation is maximised.

If this system is used for international account calls, then following a network translation, the country of origin of the call could be passed to the equipment as a series of DDI digits. This would allow, for example, different audio information to be provided for each originating country if required. Furthermore, statistics are provided on a DDI number basis so that the number of calls for each country can be readily identified.

On the other hand, the equipment can be used with analogue telephone lines. A corresponding digital to analogue converter is provided between each of the line interfaces 36,38 and the telephone network TN, and is arranged to convert the multiplexed thirty channel information into thirty separate analogue lines. The analogue connections can be either DDI or Direct Exchange Line (DEL).

The embodiment of the invention described with reference to FIG. 1 includes equal numbers of incoming channels, outgoing channels and channels in the voice services module. This is the preferred arrangement for providing an effective service since it has been designed on a "worst-case" basis such that, on a fully loaded interactive system, no "gapping" in the audio material should arise, and interactive system resources are always available. It also allows for relatively simple switching operations in the switching device 34 since normally any one incoming channel has associated with it a specific outgoing channel and a specific voice services module channel. However, if different criteria apply, it is not necessary for the channels to correspond in this way. Thus, for example, if the equipment is expected to be used in a manner involving fewer outgoing calls than incoming calls (or if the expected average time allocation for these is correspondingly different), a lesser number of outgoing channels may be provided.

One or more of the hard disc(s) 20 may be replaced by digital tape drives in other arrangements of the equipment.

The 30-channel interface described above conforms to the European E1 standard, but other arrangements of the equipment conform to other standards including the North American T1 standard in which case a 24-channel interface is used.

The equipment may be connected to the public switched telephone network, or to private telephone networks, both directly or indirectly via devices such as Private Automatic Branch Exchanges (PABX) or Automatic Call Distributors (ACD).

Other arrangements of the equipment may provide more than one each of the incoming and outgoing trunk connections.

The signaling schemes supported by the call control processor may be different on incoming and outgoing trunks; a variety of signaling schemes can be supported including both channel associated and common channel signaling schemes meeting international, national and proprietary standards.

In most cases, call-in-progress information is received using the signaling information carried on the interface; in some cases, the equipment may detect and respond to call-in-progress tones such as dial tone, ring tone, engaged tone, number unobtainable tone, as appropriate.

Although illustrative embodiments of the invention have been described in detail herein with reference to the accompanying drawings, it is to be understood that the invention is not limited to those precise embodiments, and that various changes and modifications, in addition or alternatively to those described above, can be effected therein by one skilled in the art without departing from the scope of the invention as defined by the appended claims.

We claim:

1. A voice services equipment comprising a voice services module having a plurality of audio ports and being operable to generate an interactive control signal in response to programming of the voice services module, and switching means responsive to said interactive control signal from said voice services module to provide a selectable switching function between said audio ports, a plurality of dedicated incoming line connections from a telephone network for receiving only incoming calls from the network, and a plurality of dedicated outgoing line connections to the telephone network for placing only outgoing calls to the network, such that the selectable switching function is between a selected combination of the dedicated line connections and said voice services module to provide a two-way connection between the following: (i) one of the dedicated incoming line connections and one of the audio ports, (ii) one of the dedicated incoming line connections and one of the dedicated outgoing line connections, and (iii) one of the audio ports and one of the dedicated outgoing line connections, and to provide a three-way connection between one of the dedicated incoming line connections, one of the dedicated outgoing line connections and one of the audio ports, and wherein the number of dedicated incoming line connections is the same as the number of audio ports in the voice services module, and the number of dedicated outgoing connections is no greater than the number of dedicated incoming line connections.

2. A voice services equipment according to claim 1, wherein the number of dedicated outgoing line connections is the same as the number of dedicated incoming line connections.

3. A voice services equipment according to claim 2, wherein the number of dedicated incoming line connections, dedicated outgoing line connections and audio ports is thirty.

4. A voice services equipment according to claim 2, wherein the number of dedicated incoming line connections, dedicated outgoing line connections and audio ports is twenty four.

5. A voice services equipment according to claim 2, including an incoming line interface for said dedicated incoming line connections and an outgoing line interface for said dedicated outgoing line connections.

6. A voice services equipment according to claim 1, wherein the selectable switching function of said switching means and the operation of said voice services module are user programmable.

7. A voice services equipment according to claim 6, wherein the user programmability is based on an applications language specific to voice services equipment.

8. A voice services equipment according to claim 6, including a user interface for programming functions of said equipment.

9. A voice services equipment according to claim 1, including audio recording and reproduction means for transfer of audio material between an audio memory of said voice services module, and said incoming and outgoing line connections.

10. A voice services equipment according to claim 1, including an internal database for validation of caller information.

11. A voice services equipment according to claim 1, including an internal database for storage of call statistics.

12. A voice services equipment according to claim 1, including means for connection to an external database.

13. A voice services equipment according to claim 1, including means for connection to a host computer.

14. A voice services equipment according to claim 1, wherein said switching means is operable initially to switch an incoming call to one of said audio ports of said voice services module, and then to switch said incoming call to an outgoing line connection.

15. A voice services equipment according to claim 14, wherein said switching means allows said voice services module to continue monitoring the call even after switching the call to the outgoing line connection.

16. A voice services equipment according to claim 15, including a call duration calculating means for calculating the duration of the call on the outgoing line connection.

17. A voice services equipment according to claim 14, wherein call switching to the outgoing line is enabled only when at least one particular condition is satisfied.

18. A voice services equipment according to claim 17, wherein said particular condition is entry of an identification number by the caller.

19. A voice services equipment according to claim 17, wherein said particular condition is the called party's acceptance of the call.

20. A voice services equipment according to claim 14, including a message means operable, in the absence of an answer on the outgoing line, to store a message from the caller and subsequently dial the called party's number to replay the stored message to the called party.

21. A voice services equipment according to claim 1, including storage means for storing a plurality of telephone numbers.

22. A voice services equipment according to claim 21, wherein the stored telephone numbers are accessible to a caller upon validation by means of abbreviated codes input by the caller.

23. A voice services equipment according to claim 21, wherein the caller, upon changing location, can store a replacement telephone number in said storage means whereupon subsequent calls for that caller will be directed to said replacement number.

* * * * *